United States Patent [19]

Marcoux et al.

[11] 4,279,234
[45] Jul. 21, 1981

[54] EARLY FUEL EVAPORATION OF CARBURETION SYSTEM

[75] Inventors: Leo Marcoux, Rehoboth; Peter G. Berg, Norton, both of Mass.

[73] Assignee: Texas Instruments Incorporated, Dallas, Tex.

[21] Appl. No.: 167,307

[22] Filed: Jul. 10, 1980

Related U.S. Application Data

[60] Continuation of Ser. No. 2,817, Jan. 12, 1979, abandoned, which is a division of Ser. No. 721,728, Sep. 9, 1976, Pat. No. 4,141,377.

[51] Int. Cl.³ .............................................. F02M 31/00
[52] U.S. Cl. ..................................... 123/549; 123/557
[58] Field of Search ........................ 123/549, 557, 552; 219/206, 307, 374, 375, 376, 381, 382, 505; 261/142; 338/22 R

[56] References Cited

U.S. PATENT DOCUMENTS 3,927,300  12/1975  Wada .................................... 219/381
3,987,772  10/1976  McBude ............................... 123/549

Primary Examiner—Ronald H. Lazarus
Attorney, Agent, or Firm—James P. McAndrews; John A. Haug; Melvin Sharp

[57] ABSTRACT

A carburetion system for providing improved cold start engine operation comprises a carburetor having an air-fuel passage, an air inlet to the passage, a fuel inlet to the passage for mixing fuel and air in the passage, and an outlet from the passage for delivering a mixture of air and vaporized fuel to the engine. A heater comprising a ceramic resistor body of a material of positive temperature coefficient of resistivity has a plurality of passages extending through the body and has means directing electrical current through the body for heating the body. The heater is mounted at the outlet of the air fuel passage of the carburetor with the heater body passages aligned with the air-fuel passage to pass the air-fuel mixture through the heater passages in heat-transfer relation to the body to facilitate vaporization and mixing of the fuel in the air-fuel mixture.

3 Claims, 2 Drawing Figures

EARLY FUEL EVAPORATION OF CARBURETION SYSTEM

This is a continuation of Ser. No. 2,817 filed Jan. 12, 1979, now abandoned which was a division of application Ser. No. 721,728, filed Sept. 9, 1976, now U.S. Pat. No. 4,141,377.

BACKGROUND AND SUMMARY OF INVENTION

In a conventional carburetion system for an automotive engine, gasoline and air are drawn into a carburetor and are mixed in appropriate proportions for delivery to the engine. In this arrangement, it is desirable that the gasoline fuel be fully vaporized and mixed with the air to assure maximum fuel efficiency and to avoid release of unburned hydrocarbon pollutants to the atmosphere in the engine exhaust. However, particularly where operation of the engine is initiated from a cold start under low ambient temperature conditions, it is difficult to achieve full fuel vaporization in a conventional carburetion system. That is, where the temperature of the air and fuel drawn into the carburetor is low, and where the engine itself is also at a low temperature, full fuel vaporization does not always occur and the air-fuel mixture delivered to the engine tends to include droplets of unvaporized fuel. In this regard, conventional carburetors are adapted to provide a fuel rich air-fuel mixture under such operating conditions to facilitate motor starting and this results in incorporation of even greater amounts of unvaporized fuel in the air-fuel mixture. Attempts have been made to preheat the air-fuel mixture delivered to an automotive engine, but these attempts have not been fully effective in transferring heat to the air-fuel mixture and have not usually been fully operative sometime often after initiation of engine operation.

It is an object of this invention to provide a novel and improved carburetion system for an automotive engine; to provide such an improved carburetion system which achieves improved vaporization and mixing of fuel with air for delivery to an automotive engine; to provide such an improved system which efficiently and effectively heats an air-fuel mixture for achieving fuel vaporization prior to delivery of the air-fuel mixture to the engine; to provide such a system which is operative to heat the air-fuel mixture almost immediately after initiation of engine operation and to provide such an improved carburetion system which is easily and economically manufactured and which adapted for use with conventional automotive engines.

Briefly described, the novel and improved carburetion system of this invention includes a carburetor of any conventional type having an air-fuel passage, having an air inlet to the air fuel passage, having a fuel inlet to the air-fuel passage for mixing fuel with air in the air-fuel passage, and an outlet from the air-fuel passage for delivering a mixture of air and vaporized fuel to an automotive engine. The improved carburetion system of this invention then further includes a heater means preferably comprising a body of ceramic resistor material of positive temperature coefficient of resistivity which is adapted to display a sharp, anomalous increase in resistivity when the body is heated to a selected temperature. The resistor body is provided with a plurality of passage extending through the body between opposite ends of the body and means are provided for directing electrical current through the body for heating the body. The heater means is then mounted relative to the carburetor so that at least part of at least one consitituent of the air-fuel mixture is passed through the heater passages in heat-transfer relation to the heater body for facilitating vaporization of the fuel constituent of the air-fuel mixture. Preferably, for example, the heater means is mounted on the carburetor at the outlet of the air-fuel passage with the heater passages aligned with the air-fuel passage so that the air-fuel mixture provided by the carburetor is directed through the heater passages in efficient heat-transfer relation to the heater body. In this way, highly effective vaporization of the fuel in the air-fuel mixture is achieved prior to delivery of the air-fuel mixture to the engine. Alternately, the heater means is disposed in the air inlet to the air-fuel passage or in the fuel inlet to the air-fuel passage for permitting the air or fuel to pass through the heater body passages in heat-transfer relation to the heater body.

In a preferred embodiment of this invention, where the heater means is mounted at the outlet of the air-fuel passage for passing the air-fuel mixture through the heater passages, a screen mesh is mounted at the inlet side of the heater passages for dispersing fuel droplets in the air-fuel mixture to assure that the droplets are fully vaporized in passing through the heater passages. Preferably also, a screen mesh is mounted at the outlet side of the heater body passages to prevent any chips of the ceramic resistor body falling into the automotive engine. In a preferred embodiment of the invention, the heater body is provided with contacts in ohmic contact relation to the ceramic resistor body, the heater body is enclosed in a housing having apertures aligned with the heater body passages, and terminal means are connected to the ohmic contacts to extend exteriorly of the housing. The housing is then provided with means for mounting the housing at the outlet of the air-fuel passage of the carburetor sealed to the carburetor with the housing apertures and the heater body passages aligned with the air-fuel passage.

Other objects, advantages and details of the novel and improved carburetion system of this invention appear in the following detailed description of preferred embodiments of the invention, the detailed description referring to the drawings in which:

FIG. 1 is a section view along the longitudinal axis of a preferred embodiment of the carburetion system of this invention; and FIG. 2 is a partial section view similar to FIG. 1 illustrating another preferred embodiment of the carburetion system of this invention.

DESCRIPTION OF THE EMBODIMENTS

Figure 1:
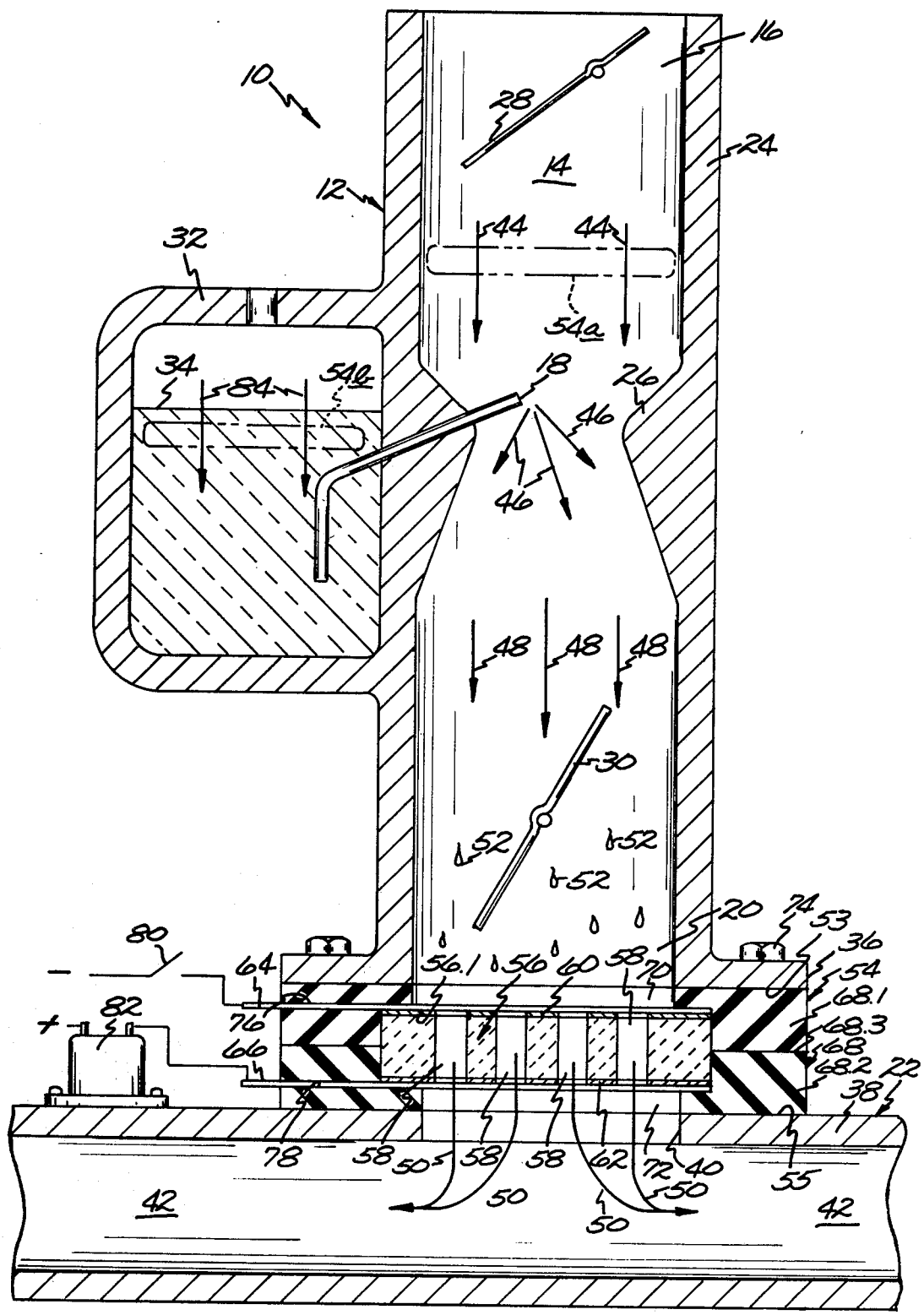

Referring to the drawings, 10 in FIG. 1 indicates the novel and improved carburetion system of this invention which is shown to include a carburetor 12 of any conventional type having an air-fuel passage 14, having an air inlet 16 to the air-fuel passage, having a fuel inlet 18 to the air-fuel passage for mixing fuel with air in the air-fuel passage, and having an outlet 20 from the air-fuel passage for delivering a mixture of air and vaporized fuel to an automotive engine 22. Such a conventional carburetor typically includes a body 24 defining the air-fuel passage 14 with a venturi portion 26 as indicated in FIG. 1, choke valve means 28, throttle plate means 30, and a supply chamber 32 for gasoline fuel 34 as is diagrammatically illustrated in FIG. 1. The conventional carburetor also typically includes a flange 36 for use in mounting the carburetor relative to the intake manifold 38 of the engine with the air-fuel passage 14 aligned with an entry 40 to the intake manifold passage 42 leading to the engine cylinders. In operation of the conventional carburetor, a vacuum established in the intake manifold while the engine is running draws air into the carburetor inlet 16 as indicated by the arrows 44 while the reduced pressure established at the venturi constriction in the air-fuel passage also draws fuel through the jet or nozzle inlet 18 as indicated by the arrows 46, thereby to create a mixture of air and vaporized fuel in the air-fuel passage as indicated by the arrows 48. This air-fuel mixture is then drawn through the air-fuel passage outlet 20 and into the intake manifold as indicated by the arrows 50 for delivery to the engine as shown in FIG. 1. In the conventional carburetor, the throttle plate 30 is movable through appropriate linkages and controls for regulating the volume of air-fuel mixture delivered to the engine and the choke 26 is movable in response to the pull of the intake manifold vacuum and to thermally responsive spring means for regulating the entry of air into the carburetor. As the carburetor 12 is of any conventional type, it is not further described herein and it will be understood that the improved carburetor system of this invention utilizes any single, double or quadruple barrel carburetor or the like which is adapted to furnish an air-fuel mixture to an automotive engine.

In this regard, when operation of an automobile engine is initiated from a cold start, particularly under low ambient temperature conditions, the air 44 and fuel 46 drawn into the carburetor 12 are frequently at too low a temperature to effect full vaporization of the fuel within the air-fuel passage of the carburetor. Further, the temperature of the engine 22 is also too low to effect sufficient heating of the air-fuel mixture 48 to achieve full vaporization of the fuel. In the conventional carburetor, the choke 26 is commonly adapted to restrict the entry of air into the carburetor, during engine start up, thereby to assure that the air-fuel mixture delivered to the engine is sufficiently rich in fuel to provide smooth engine starting. However, under these engine starting conditions, the air-fuel mixture 48 commonly includes droplets 52 of unvaporized fuel as shown in FIG. 1. As a result, the engine achieves only poor fuel efficiency during engine starting and, more important, excessive quantities of unburned hydrocarbon pollutants tend to be emitted to the atmosphere in the engine exhaust during engine start up.

In accordance with this invention, however, heater means 54 are arranged for heating either one or both constituents of the air-fuel mixture 48 prior to delivery of the air-fuel mixture to the automotive engine. Preferably, for example, the heater means is mounted at the outlet 20 of the carburetor air-fuel passage 14 as shown in FIG. 1 and is arranged to heat the air-fuel mixture 48 as the air-fuel mixture is passed from the carburetor air-fuel passage into the intake manifold 38. Generally, where the carburetor utilized is adapted to provide multiple stage carburetion, the heater means 54 of this invention is incorporated in the primary stage of the carburetor. That is, the heater means is typically mounted at the outlet of the primary stage or barrel of the carburetor to provide improved engine starting as will be understood.

In a preferred embodiment of this invention, the heater means 54 comprises a body 56 of a ceramic resistor material or the like of positive temperature coefficient of resistivity (PTC), the body having a plurality of passages 58 therein extending through the body between opposite ends 56.1 and 56.2 of the body. Ohmic contacts 60 and 62 are then attached to the resistor body in spaced relation to each other as shown in FIG. 1 and terminals 64 and 66 are soldered or otherwise electrically connected to the respective ohmic contacts. The resistor body 56 is then enclosed in a housing 68 with the terminals 64 and 66 extending exteriorly of the housing, the housing having apertures 70 and 72 at opposite sides of the housing aligned with the heater body passages 58 and having mounting apertures (not shown) through which the carburetor mounting screws 74 extend to threadedly engage the manifold 38 for mounting the carburetor 12 and the heater means 54 in alignment as shown. Preferably, the heater means 54 is sealed to the carburetor 12 by gasket means or cement along the surface 53 and to the manifold 38 by similar means along the surface 55 in any conventional manner.

Typically, for example, the resistor body 56 is formed of a lanthanum doped barium titanate ceramic resistor material which has a positive temperature coefficient of resistivity and is adapted to display a sharp, anomalous increase in resistivity when heated to a selected temperature. Preferably, for example, the body is formed of a ceramic titanate having the empirical formula of $Ba_{.968} Pb_{.030} La_{.002} Ti O_3$ which has a room temperature resistivity of about 36 ohm-centimeters and a Curie temperature of about 140° C. and which is adapted to display a sharp anomalous increase in resistivity to about $10^5$ ohm-centimeters when heated above its anomaly temperature to about 200° C. As such PTC resistor materials are well know, the material of the body 56 is not further described herein and it will be understood that the body is formed of any of various well known PTC resistor materials within the scope of this invention.

Preferably, each of the body passages 58 is of square cross section or the like and preferably the passages 58 are provided with sufficient size and in sufficient number to permit the air-fuel mixture 48 to be drawn into the intake manifold without developing an excessive pressure drop across the heater means 54. Alternately, the heater body passages are provided in a pattern extending over less than the entire cross section of the air-fuel passage 14, or as noted above, where a multibarrel carburetor is used, the heater means is located at the outlet of only one or two barrels of the carburetor as may be desired.

Preferably also, the ohmic contacts 60 and 62 are applied to the ends 56.1 and 56.2 of the resistor body in the manner shown in U.S. Pat. No. 3,676,211 or in any other conventional manner to leave the ends of the heater body passages 58 open as shown in FIG. 1. That is, the ohmic contacts 60 and 62 preferably comprise an electrically conductive metallic spray coating of copper on aluminum or the like adhered in ohmic contact relation to the ceramic titanate material of the resistor body 56. The terminals 64 and 66 are then soldered or welded or resiliently contacted to the respective ohmic contacts and are extended through openings 76 and 78 in the housing 68 to extend exteriorly of the housing. In this regard, the housing 68 is preferably formed in two halves 68.1 and 68.2 which are gasketed or cemented or otherwise sealed together in conventional manner along the surface 68.3 to enclose the heater body 56.

In this arrangement, the terminals 64 and 66 are easily connected to an electrical power source in the automobile as is diagrammatically illustrated in FIG. 1 so that, on closing of the ignition switch 80 for initiation of engine operation, electrical current is directed through the resistor body 56 for rapidly self-heating the body promptly after the initiation of engine operation. Accordingly, as soon as engine operation is initiated, the heater means 54 is adapted to rapidly heat the air-fuel mixture 48 which is drawn through the heater body passages 58 in efficient heat transfer relation to the resistor body 56, thereby to vaporize any unvaporized fuel in the air-fuel mixture 48 for significantly enhancing fuel efficiency of the engine during engine start up and for significantly reducing the amount of unburned hydrocarbon pollutants which the engine will emit to the atmosphere in the engine exhaust.

The material of the resistor body has a positive temperature coefficient of resistivity, and is preferably adapted to display a sharp, anomalous increase in resistivity when heated to a selected temperature. Accordingly, as the resistor body becomes heated by current flow in the body, the resistivity of the body increases tending to restrict the level of current directed through the body. Thus, particularly where the resistor material displays a sharp anomalous increase in resistivity at a selected temperature, the resistor body temperature is self-regulating. That is, if the supply of air to the carburetor 12 should be blocked, the body temperature and resistivity both tend to increase while the current flowing in the body tends to decrease until the body temperature and current stabilize at a safe level at which the heat generated by the lower current balances the heat dissipated from the body. Conversely, as the air-fuel mixture 48 flows through the body passages 58 in heat-transfer relation to the body, the cooling effect of the flow of the air-fuel mixture, and the cooling effect of fuel vaporization occurring as the air-fuel mixture passes through the heater means, both tend to cool the body, thereby tending to reduce body resistivity and to increase current flow in the body for enhancing heat generation by the body.

It should be understood that, where the heater means 54 accomplishes improved fuel vaporization in the carburetion system of this invention, the carburetor 12 used in the system, and particularly the choke means thereof, will be adjusted in a conventional manner to compensate for the enhanced fuel efficiencies achieved by the system of the invention. That is, for example, the carburetor choke means is desirably adjusted to considerably shorten or even eliminate the period during which the carburetor provides a fuel rich mixture to the engine.

When the engine start up period as described above is completed, and when the temperature of the engine has increased to the point where heating of the air-fuel mixture 48 by the heater means 54 is no longer useful or necessary, it is usually desirable to discontinue operation of the heater means 54 to conserve power. For this reason, the improved carburetion system of this invention desirably includes an electrical control means 82 arranged in series with the heater for interrupting the supply of heating current to the heater means. In one preferred embodiment of this invention, the control means 82 comprises any conventional time delay relay means which is operable after a fixed period of time to effectively inactivate the heater means 54 when the engine start up period has been completed. Alternately, the control means 82 comprises any conventional thermostat means or other thermally responsive control means or the like which is mounted to be responsive to engine temperature or the like as shown in FIG. 1 for effectively inactivating the heater means 54 when engine temperature has increased to the point where operation of the heater means 54 is no longer useful or necessary. As the control means 82 is of any conventional type within the scope of this invention, the control means is not further described and it will be understood that the control means is mounted either spaced from or integral with the heater means to interrupt heater operation when engine start up is completed. Alternately, of course, similar control means for reducing rather than eliminating the heat output of the heater means 54 after the engine start up period are also employed where desired as where the heater means is to be used after start up to enhance steady state fuel vaporization during very cold weather.

It should be understood that although the heater means 54 is shown to be mounted at the outlet of the carburetor air-fuel passage for heating the air-fuel mixture 48 prior to delivery of that mixture to the engine 22, the heater means is also adapted to be mounted at other locations relative to the carburetor 12 for separately heating either one of the constituents of the air-fuel mixture within the scope of this invention. For example, in one alternate embodiment of the invention, the heater means 54 is mounted in the air inlet 16 of the carburetor as indicated by the broken lines 54a, whereby the air 44 drawn into the carburetor passes through the heater passages of the heater 54a for heating the air prior to mixing of the fuel 46 as will be understood so that the heated air is adapted to achieve substantially full vaporization of the fuel 46 entering at the fuel inlet. Alternately, the heater means is mounted in the fuel supply chamber 32 as indicated at 54b in FIG. 1 whereby the fuel 34 flowing toward the fuel inlet jet or nozzle 18 is directed through the heater passages of the heater means 54b as indicated by the arrows 84 in FIG. 1. In this latter arrangement, heating of the fuel prior to feeding of the fuel into the air-fuel passage 14 is also adapted to enhance vaporization and mixing of the fuel with air in the air-fuel passage as will be understood.

Figure 2:
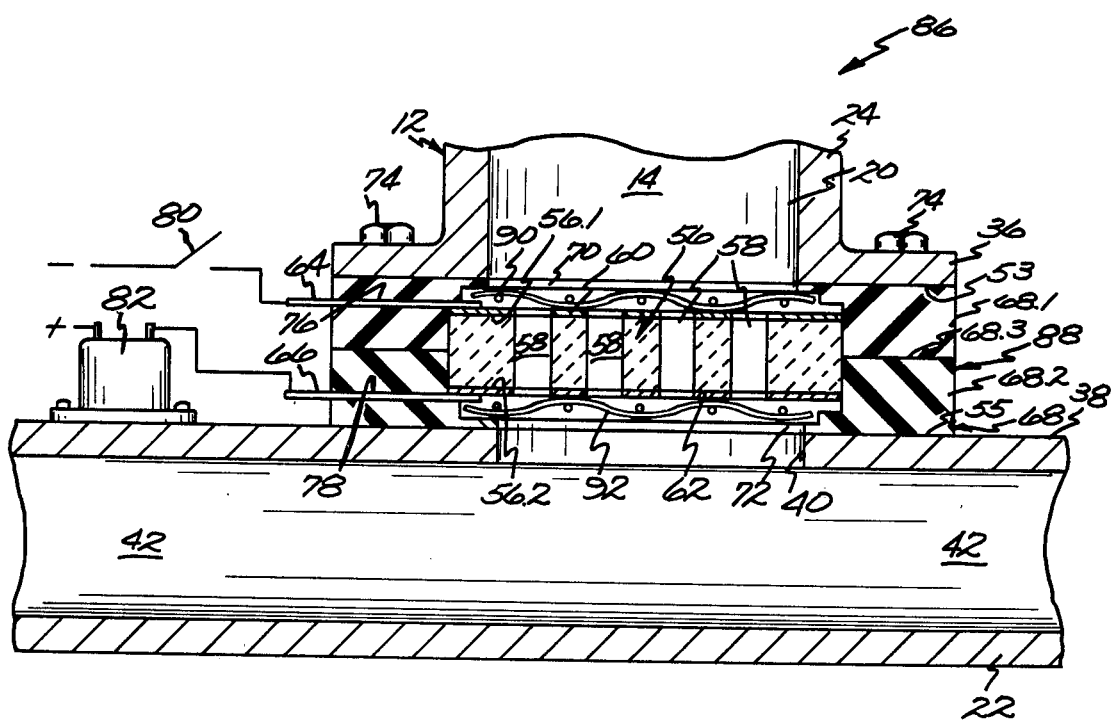

In another preferred embodiment of the carburetion system of this invention as shown at 86 in FIG. 2, the system includes a heater means 88 which is comparable to the heater means 54 as above described and which includes heater components as in the heater means 54 as indicated by the corresponding reference numerals in FIG. 2. In the heater means 88, however, screen mesh means 90 and 92, preferably formed of a non-metallic material such as woven fiberglass are disposed at the inlet and outlet ends respectively of the heater body passages 58 as shown in FIG. 2. In this arrangement, the screen mesh 90 is provided with many small mesh openings for dispersing fuel droplets 52 as they are directed into the heater body passages, thereby to increase contact of the unvaporized fuel with the heater body 56 for enhancing vaporizing of the fuel droplets by the heater means 88. In that arrangement, the screen mesh 92 serves to guard against and prevent any extraneous chips of the ceramic heater body material from entering into the intake manifold where such chips might cause damage to the engine.

It should be understood that although various embodiments of the improved carburetion system of this invention are described by way of illustrating the invention, this invention includes all modifications and equivalents of the disclosed embodiments falling within the scope of the appended claims.

We claim:

1. In combination, carburetor means having an air-fuel passage, an air inlet to said air-fuel passage for admitting varying volumes of air to the air-fuel passage, fuel supply means having a fuel inlet passing varying volumes of fuel through the fuel inlet to said air-fuel passage to be mixed with varying volumes of air in said air-fuel passage, an outlet from said air-fuel passage for delivering a mixture of air and fuel to an engine, and means moveable in the air-fuel passage to selectively vary the volume of the air-fuel mixture delivered to the engine; and a heater means for said fuel which is adapted to display variable heat-output in response to variation in the amount of fuel being furnished to the air-fuel passage through the fuel inlet as the volume of air-fuel mixture being delivered to the engine is varied, said heater means comprising a body of ceramic reistor material of positive temperature coefficient of resistivity adapted to display a sharp anamolous increase in electrical resistivity when heated to a selected temperature, said body having a plurality of heater passages extending through the body between opposite ends of the body and being mounted in said fuel supply means with said heater passages aligned to pass varying volumes of fuel therethrough before being furnished to said air-fuel passage, and means for directing electrical current through the resistor body material for heating the body to transfer selected varying amounts of heat to the varying amount of fuel directed through the heater passages for facilitating mixture of the air and fuel in the air-fuel passage prior to delivery of the air-fuel mixture to the engine.

2. The combination as set forth in claim 1 wherein said heater is disposed in the fuel supply means to heat fuel flowing toward the fuel inlet.

3. The combination as set forth in claim 1 wherein said heater is disposed in the fuel inlet for heating fuel furnished to the air-fuel passage through the fuel inlet.

* * * * *